UNITED STATES PATENT OFFICE.

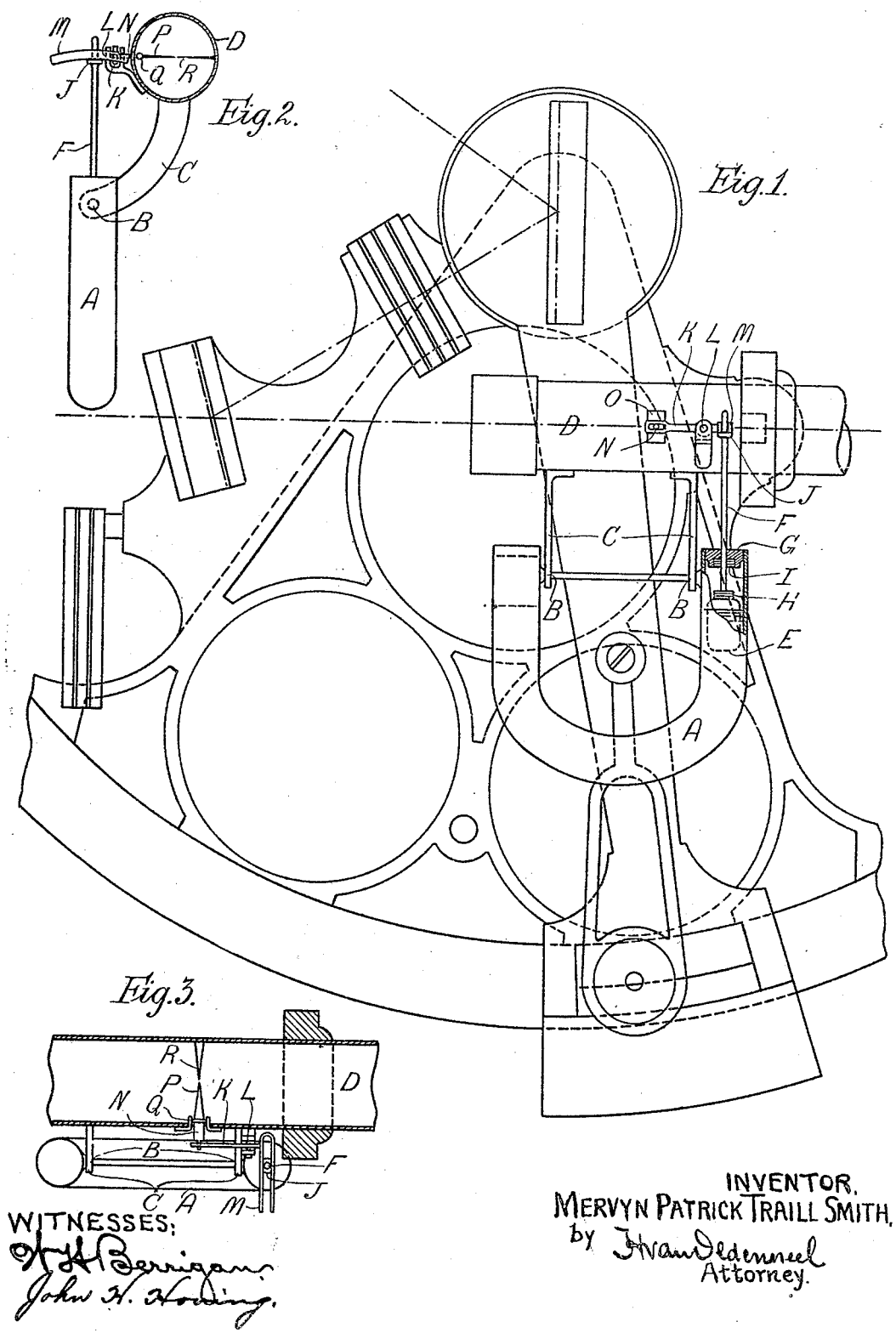

MERVYN PATRICK TRAILL SMITH, OF SLAIDBURN, CLITHEROE, ENGLAND.

SEXTANT.

957,386.        Specification of Letters Patent.        Patented May 10, 1910.

Application filed December 4, 1909. Serial No. 531,469.

*To all whom it may concern:*

Be it known that I, MERVYN PATRICK TRAILL SMITH, a subject of the King of the United Kingdom of Great Britain and Ireland, and residing at Slaidburn, Clitheroe, Yorkshire, England, have invented a certain new and useful Improvement in Sextants, of which the following is a specification.

This invention has for its object to provide for attachment to a sextant, an improved device affording an artificial horizon, which device can be used when no natural horizon is visible, or when, the height of the observer being unknown, it is impossible to make a correction for dip.

In the accompanying drawings Figure 1 is an elevation showing a sextant fitted with the attachment. Figs. 2 and 3 are detail views of the attachment.

Referring to the drawings, a U-shaped tube A, partially filled with mercury, or other viscous fluid, such as glycerin, oil or the like, is pivoted as at B so as to swing freely on arms C secured to the telescope D or to a blank tube; the line of the axis of the pivots being parallel to the plane of the instrument and to the line of collimation. In one limb of the tube A and floating freely in the mercury is a metal float E, with a rod F protruding through the screw-threaded cover G and having a screw-threaded enlargement H adapted to engage with a correspondingly threaded recess I in the said cover so as to serve as a stopper when the attachment is not in use. The float rod F is provided with a collar J adapted to impart motion to a lever K which is pivoted, as at L on the telescope D and is provided with a curved and slotted portion M at one end for engagement with said float rod and at its other end is connected to an arm N which passes through a slot O in the telescope and which forms part of a pointer P pivoted within the telescope, as at Q, and co-acting with a fixed pointer R within the telescope.

With the arrangement of devices above described, a magnification of the movement of the float is obtained.

The amount of mercury to be poured into the tube A is determined on shore, so that during an observation when the pointer P registers with the pointer R, the line of collimation of the sextant will be parallel with, or pass through the visible horizon.

Having now described my invention what I claim and desire to secure by Letters Patent of the United States is:—

1. The combination of a sextant, a tube containing liquid, said tube pivotally mounted on the sextant, a body floating in the liquid, an operating rod connected to said body, a fixed indicating device, and a movable indicating device adapted to be operated by said rod.

2. The combination of a sextant, a U-tube containing liquid, said tube pivotally mounted on the sextant, a body floating in the liquid, an operating rod connected to said body, a fixed indicating device, a movable device adapted to be operated by said rod, and a telescope connected to the sextant.

In testimony whereof I have signed my name to this specification in the presence of two subscribing witnesses.

MERVYN PATRICK TRAILL SMITH.

Witnesses:
   A. F. G. COCHRANE,
   A. J. WHETTEN.